US005823137A

United States Patent [19]

Rood et al.

[11] Patent Number: 5,823,137

[45] **Date of Patent: *Oct. 20, 1998**

[54] LITTER BOX AND PIVOTAL SIFTING DEVICE

[75] Inventors: John D. Rood, Fountain Hills, Ariz.; John W. Rood, 15120 E. Greene Valley Rd., Fountain Hills, Ariz. 85268

[73] Assignee: John W. Rood, Fountain Hills, Ariz.

[ * ] Notice: The term of this patent shall not extend beyond the expiration date of Pat. No. 5,601,052.

[21] Appl. No.: 673,621

[22] Filed: Jun. 26, 1996

[51] Int. Cl.$^{6}$ .............................. A01K 1/01; A01K 29/00

[52] U.S. Cl. .............................................. 119/166; 119/168

[58] Field of Search ..................................... 119/166, 165, 119/167, 168

[56] References Cited

U.S. PATENT DOCUMENTS

| | | | |
|---|---|---|---|
| 4,096,827 | 6/1978 | Cotter | 119/1 |
| 4,190,525 | 2/1980 | Menzel | 209/235 |
| 4,802,442 | 2/1989 | Wilson | 119/1 |
| 4,854,267 | 8/1989 | Morrow | 119/1 |
| 4,970,987 | 11/1990 | Deyle | 119/166 |
| 5,048,465 | 9/1991 | Carlisi | 119/166 |
| 5,178,099 | 1/1993 | Lapps et al. | 119/166 |
| 5,226,388 | 7/1993 | McDaniel | 119/166 |
| 5,259,340 | 11/1993 | Arbogast | 119/165 |
| 5,272,999 | 12/1993 | Nussle | 119/166 |
| 5,544,620 | 8/1996 | Sarkissian | 119/166 |
| 5,551,375 | 9/1996 | Flores | 119/166 |
| 5,601,052 | 2/1997 | Rood et al. | 119/166 |
| 5,642,814 | 7/1997 | Nelson | 119/166 |

FOREIGN PATENT DOCUMENTS

| | | | |
|---|---|---|---|
| 898086 | 4/1972 | Canada | 119/166 |

*Primary Examiner*—Edgar S. Burr
*Assistant Examiner*—Leslie Grohusky
*Attorney, Agent, or Firm*—Richard R. Mybeck; Peter B. Scull

[57] ABSTRACT

A litter box and pivotal sifting device assembly having an open base portion and a pivotally movable sifting device operably attached thereto. The base portion also has a litter holding wing portion operatively associated therewith and extending upwardly and outwardly therefrom. The pivotal sifting device is initially disposed beneath a layer of loose litter material. Thereafter, the sifting device is pivotally movable up through the litter material to collect clumped absorbent litter and fecal matter wastes thereupon while permitting loose litter material to pass therethrough. The sifting device is pivoted still further to deliver the wastes to a disposal site. Once dumped, the assembly is quickly restored to its clean and ready for use position by rotating the assembly successively onto the first and second angular end walls of the wing portion whereupon in response to gravitational forces, the loose granular litter material flows into the wing portion and thereafter while rotating the assembly in reverse sequence back to its animal use position, the sifting device is automatically, pivotally returned to its operative position in the bottom of the base portion covered with the loose granular litter material.

19 Claims, 2 Drawing Sheets

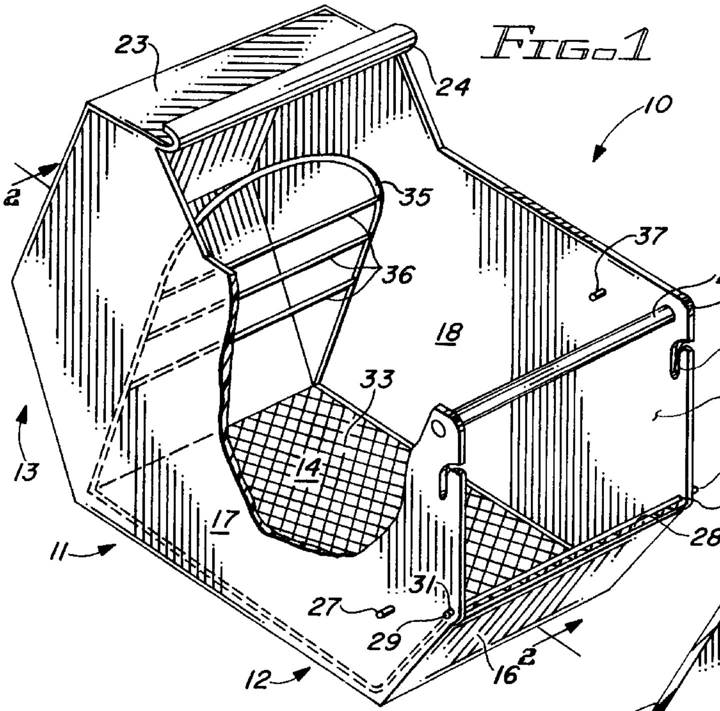
FIG. 1
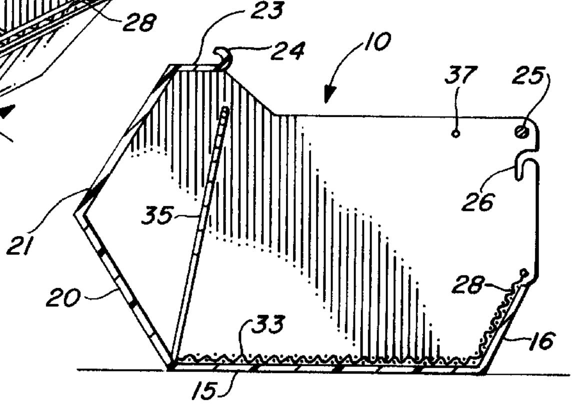
FIG. 2
FIG. 3
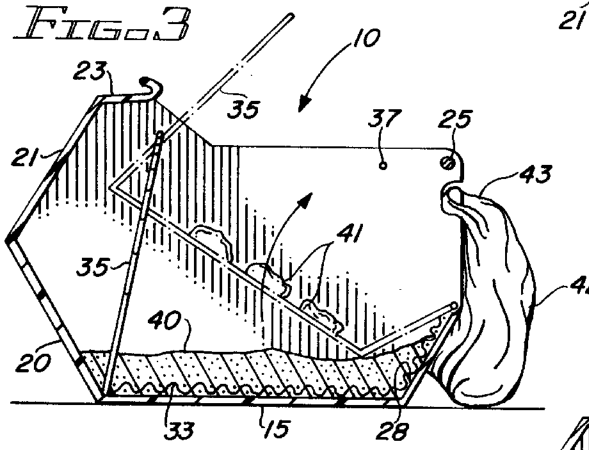
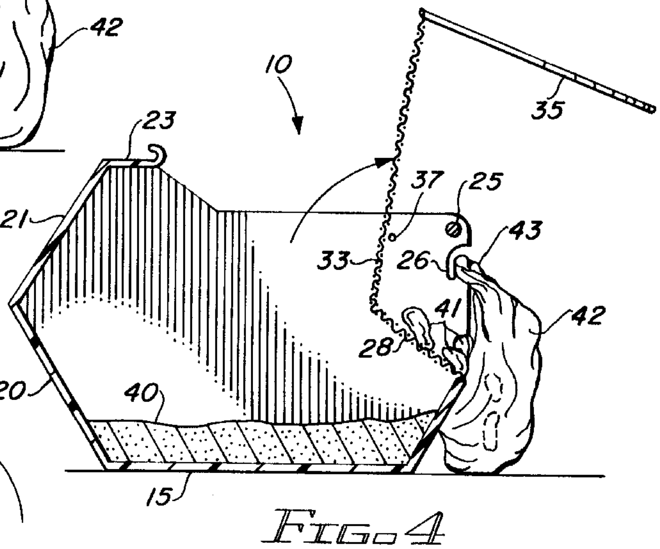
FIG. 4
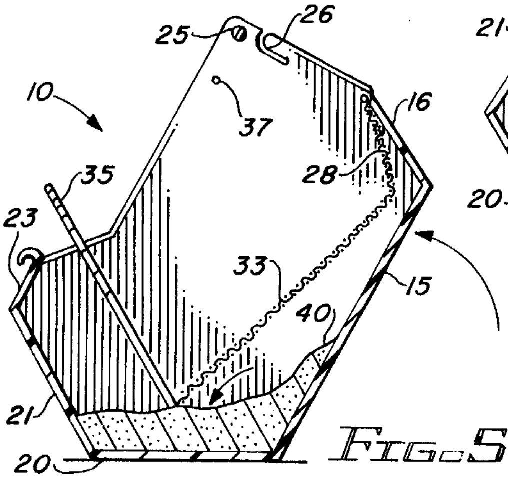
FIG. 5

LITTER BOX AND PIVOTAL SIFTING DEVICE

INTRODUCTION

This invention relates generally to an improved litter box and more particularly to a litter box having a pivotal sifting device assembly operatively associated therewith which enables solid pet excrement, including fecal matter and clumped absorbent litter, to be easily and efficiently removed while avoiding human contact therewith.

BACKGROUND OF THE INVENTION

Pet litter boxes, particularly those used for cats and small animals, typically make use of a tray-like structure to provide a reservoir of granular litter material for easy animal access. The traditional method of disposing of the accumulated urine and fecal matter has been to discard the entire contents of the litter box, including unpolluted litter material, and refill the box with fresh litter material.

More recently, however, environmental and economic concerns have led to the development of quasi-reusable litter material. Thus, when a pet relieves itself, a popular absorbent granular litter material coagulates and forms clumps as urine and other liquid wastes are deposited within the box. These clumps and any fecal matter are then removed by means of a foraminous or slotted scoop which removes the coagulated/clumped material from the clean litter material which is left in the tray for further animal use. Thus, while the art has addressed the selective disposal of contaminated granular absorbent litter material with some success, currently available devices contain many residual problems as will be hereinafter discussed.

There are a number of prior patents which relate to the disposal of waste from house pets. Among these is Cotter (U.S. Pat. No. 4,096,827) which teaches a suitcase-type structure having two substantially identical compartments which are pivotally connected to each other and are latchable together in a closed position by a three way handle. A screen unit is mounted between the container compartments and is selectively securable to one or the other by the handle structure. The litter material is operably disposed in one compartment when the box is open. The screen is then latched to the other compartment. To separate the waste from the litter, the structure is closed and turned upside down causing the clean litter to fall through the screen and into the opposite compartment while the waste matter is retained on the screen. The box is then opened, the screen with the refuse trapped thereon is removed and the refuse is discarded. The screen is then returned to the structure and secured for further use as described above.

Menzel (U.S. Pat. No. 4,190,525) teaches several animal litter box devices. In one, a sifting screen is detachably mounted to a crank system which allows the user to rotate the screen through the litter to sift and collect the refuse therein. In another, Menzel teaches a box which is provided with vertically extending slots which receive and hold a screen therein. The litter in this embodiment is separated from the refuse by raising one end of the box to cause the litter material to pass through the screen while collecting the refuse thereupon. The screen is then removed from the device and the accumulated refuse is discarded therefrom.

Wilson (U.S. Pat. No. 4,802,442) teaches yet another litter screening device. Wilson has two planar bottom panels of a mesh material having openings defined therein which are sized to pass the granular litter but not the waste. The bottom panels of Wilson are pivotally connected along a central axis. Handles are attached to the sides of each panel to facilitate moving the panels up and down through the litter. The handles may be either rigidly or pivotally attached to the respective mesh panels.

Morrow (U.S. Pat. No. 4,854,267) discloses a mechanical litter box which has a screening device pivotally mounted therein. The entire Morrow device is mechanically operated to pivot the screen up through the litter and then to tilt both the box and screen ninety degrees to dump the contaminants trapped by the screen into a discharge bin. The entire device is then rotated back so that the box will be returned to its original position with the screen flat beneath a bed of litter material. Morrow teaches rotation of no more than ninety degrees. Thus, the base of the Morrow device retains a substantial amount of litter material resting thereagainst depending only on the angle of repose of the litter material.

Deyle (U.S. Pat. No. 4,970,987) teaches another box and sifting device combination. The Deyle sifting device is formed in two sections which are connected by a pivotal and slidable connecting means that allows the sections to pivot relative to each other between an open and a closed position. The sections are also slidably movable relative to each other to a waste dumping position after being pivoted to the closed position. In use, the sifting device lays flat on the bottom of a litter box beneath the litter material. To sift, the handles are lifted and the sifting device is pivoted into its closed position. Then, the two sections are slidably moved to the waste dumping position. The waste is discarded and the sifting device is replaced in the litter by pressing the device downwardly through the litter while simultaneously shifting the device back and forth so that the litter material is forced upwardly through the openings in the sifting device.

Lapps et al. (U.S. Pat. No. 5,178,099) teaches yet another device for sifting animal litter. This device comprises a tray and a compartmentalized hood which are latched together. The lower portion of the rear panel has a screen and an enclosed compartment. To screen the animal waste, the user tilts the device so all the litter falls toward the rear panel of the hood. The clean litter material, but not the waste, falls through the screen and into the enclosed compartment. The upper portion of the rear panel has an exit chute so that when the apparatus is tilted even further, the waste, which was separated from the clean litter material, falls through the exit chute and into a garbage bag. The apparatus is then tilted back down and the litter moves from the enclosed compartment back through the screen into the tray. A similar device with like mechanical operations is shown by Nussle (U.S. Pat. No. 5,272,999). However, neither Lapps nor Nussle discloses a pivotal sifting device.

The basic object of the prior art devices has been to separate the waste from the litter in such a way that the waste may be discarded and the remaining litter used again. The described devices have met with varied degrees of success. The most relevant with respect to the present invention appear to be those in which the sifting device is mounted in or to the box for movement relative thereto. The present invention has been developed to overcome the lingering problem of easily replacing the screen in the box beneath the litter after the waste material has been removed and discarded. Most of the prior art devices required great physical exertion to either shake the box and/or the sifting device itself to achieve the desired replacement.

The present invention is clearly an improvement over the prior art because it overcomes the aforesaid problems as well as provides a unique pivotal attachment of the sifting device to the box. This feature, which is operable without exposing the operator to body contact with the waste, combined with the novel means described for capturing and disposing of the waste provides a unique and highly useful alternative for maintaining sanitation for household pets.

BRIEF SUMMARY OF THE INVENTION

The present invention relates to a new and improved litter box and, more particularly, to a new and improved litter box assembly having a discrete sifting device pivotally mounted within a litter box housing to enable the simple removal of clumped urine and fecal matter from the particulate litter material disposed therewithin. This removal is performed by pivoting the sifting device through the litter material in the litter box to separate the waste from the clean litter material. The present invention further includes means for diverting uncontaminated litter material out of the way while the sifting device, after having dumped the accumulated waste, is readily reinstalled into the housing in such a way that the diverted litter material may be quickly and neatly restored to its operative position over the sifting device which is thus buried thereunder.

Accordingly, the principal object of the present invention is to provide a litter box assembly which embodies a unique coaction between a litter box housing, a pivotal sifting device mounted thereto, and litter material disposed therein which enables the pet owner to dispose of contaminated waste material without touching it, avoids storing a soiled sifting device outside the box in his/her living area, and which further enables the sifting device screen to be automatically restored to its operative position beneath the litter material in a simple fashion.

A further object of the present invention is to provide a litter box assembly in which a pivotal sifting device is movable through contaminated litter material to remove the contaminants therefrom and which thereafter, by simple movement of the housing, enables the clean litter to be moved to a controlled site remote from the screen bed while the sifting device is automatically reseated into the bed and then, by additional simple but strategic movement of the housing, permits the litter to be readily and uniformly re-deployed in superposition over the sifting device screen for reuse.

These and still further objects as shall hereinafter appear are fulfilled by the present invention in a remarkably unexpected fashion as will be readily discerned from the following detailed description of an exemplary embodiment thereof particularly when read in conjunction with the accompanying drawings in which like parts bear like numerals throughout the several views.

BRIEF DESCRIPTION OF THE DRAWINGS

In the drawings:

FIG. 1 is an isometric view with a partial cutaway of a litter box and pivotal sifting device assembly embodying the present invention;

FIG. 2 is a cross-sectional view of the litter box and pivotal sifting device assembly taken on line 2—2 of FIG. 1;

FIG. 3 is the cross-sectional view of the litter box and pivotal sifting device assembly shown in FIG. 2 after granular litter material has been disposed therein and the sifting device (in phantom) has been partially moved therein;

FIG. 4 is the cross-sectional view of the litter box and pivotal sifting device assembly shown in FIG. 3 after the sifting device has been fully pivoted to deliver the waste accumulated thereupon into a waste receptacle detachably attached to said box;

FIG. 5 is the cross-sectional view of the litter box and pivotal sifting device assembly shown in FIG. 3 seated on the first end wall of the wing portion and showing the gravitational movement of the litter material from a first position to a second position;

DESCRIPTION OF THE PREFERRED EMBODIMENT

Figure 6:
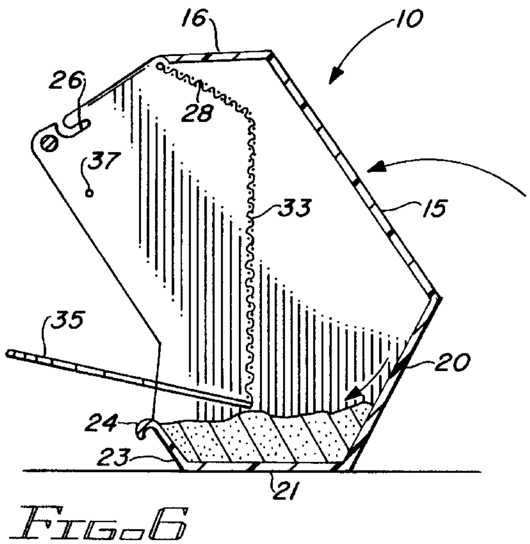
FIG. 6 is the cross-sectional view of the litter box and pivotal sifting device assembly shown in FIG. 3 seated on a second end wall of the wing portion and showing the gravitational movement of the litter material from the second position to a third position.

Referring now to the drawings, and particularly to FIGS. 1 and 2, a litter box assembly embodying the present invention is identified by the general reference numeral 10. Litter box assembly 10 comprises a housing 11 having a base portion 12 and a litter holding wing portion 13. A sifting device 14 is operably disposed within and pivotally mounted to base portion 12 in a manner to be hereinafter more fully described.

In a preferred embodiment of the present invention, base portion 12 comprises a substantially rectangular, upwardly open box-like structure having a substantially rectangular bottom member 15, an end wall 16 disposed in an angular relationship to bottom member 15 at the proximal end thereof, and first and second side walls 17, 18 disposed in spaced, generally parallel relationship to each other and operatively associated with and extending from end wall 16 to wing portion 13.

Wing portion 13 extends outwardly from the distal end of base portion 12 and includes a first angularly disposed or slanted end wall portion 20, a second slanted end wall portion 21, and a roof member 23. A lip 24, as will be discussed in more detail below, is integrally attached to roof member 23. As shown, side walls 17, 18 are integrally connected to proximal end wall 16, bottom member 15, distal slanted end walls 20, 21, and roof member 23. Side walls 17, 18 preferably present substantially squared corners as shown at 19 on their upper proximal ends to provide for the addition of other optional structures or features such as handle 25 and notches 26. Handle 25, as shown, is preferably cylindrical and is disposed at and between the upper, proximal corners of side walls 17, 18. Lip 24 and handle 25 may be used simultaneously or separately to maneuver device 10 as will be described below. Notches 26 are used with exterior detents 27 (one of which being shown attached to the exterior side of side wall 17 in FIG. 1) for holding a waste disposal bag as is also described in more detail below.

First slanted end wall portion 20 extends up and out from bottom member 15 and in the preferred embodiment, defines therewith a first included interior angle of about 120°. Second slanted end wall portion 21 extends up and in from first end wall portion 20 and, again, in the preferred embodiment, defines therewith a second included interior angle of about 120°. Roof member 23 extends from the second slanted end wall portion 21 and preferably defines therewith a third included interior angle of about 120° so that roof member 23 is disposed in generally parallel spaced relationship above bottom member 15. The above described three included angles of about 120° each are, in one embodiment, preferred to be equal; however, a plurality of diverse, unequal angles may be employed and yet continue to achieve the same functional relationship. Specifically, it appears to be most beneficial for the first included angle to be greater than 90°, and for the second included angle to be less than 180°. A certain desirable symmetry is achievable by making the third included angle equal to the first included angle. With the proper corresponding second included angle, such an arrangement assures that roof member 23 will be parallel with bottom member 15. Examples of this parallelism include the 120-120-120 arrangement described above as well as 110-140-110; or 100-160-100, for example. In some circumstances, angles going the other way (i.e. making the second angle smaller than 120°) as in 125-110-125, or 130-100-130 etc., might be desirable. It is however, not necessary, for the first and third angles to always be equal because unequal first and third angles will also provide satisfactory results.

In the preferred embodiment, proximal end wall 16 is angularly disposed out and away from bottom member 15. Wall 16 thus provides a beveled surface upon which the angled portion 28 of sifting device 14 may rest when device 14 is in the animal use position seated on bottom member 15. Wall 16, in being angularly disposed, also provides a front surface onto which housing 11 may be rotated to obtain a uniform distribution of litter material 40 as will be described below.

As shown, assembly 10 is formed so that when the entire unit is rotated to seat upon end wall portion 20 and/or upon end wall portion 21 (as shown in FIG. 6), granulated litter material 40 migrates into wing portion 13 which defines a temporary storage site for litter material 40 in a manner and for a purpose to be hereinafter described in detail.

Sifting device 14 as shown in FIG. 1, is pivotally attached to housing 11. Post portions 29, 30 are disposed one each in corresponding side walls 17, 18 through apertures 31, 32. Alternative pivotal connections such as hinges, cranks, levers, and the like may be used in lieu of post portions 29, 30 and apertures 31, 32 to pivotally attach sifting device 14 to housing 11 although such alternative arrangements may add to the cost of the device.

Angled, foraminous portion 28 of sifting device 14 is attached to post portions 29, 30 and a generally rectangular, foraminous main screen portion 33 is connected to angled portion 28. An upstanding handle portion 35 is attached to the distal end of main screen 33. It is preferred that handle portion 35 be upright but not quite at 90° relative to main screen portion 33. This, along with the addition of one or more cross bars 36 between the upstanding legs of handle 35, provides a barrier to keep an adventuresome animal from crossing into and urinating, defecating or otherwise soiling wing portion 13 or the small unsiftable portion of litter material 39 (see FIGS. 3 and 8) disposed therein. Two interior detents 37 are attached one each to the interior sides of side walls 17, 18 to engage main screen portion 33 during use as described below.

An assembly 10 embodying the present invention can be constructed from any desired material, such as wood, cardboard, plastic, metal or a like conventional material which possesses sufficient strength to maintain its shape during use. Assembly 10 can likewise be constructed in integral pieces and assembled into the unit described above, or it can be molded as a single entity using conventional injection molding or casting equipment. The preferred embodiment is made from either an injection molded plastic of a type well known to those in the art or from multiple pieces of heat moldable plastic which are then glued together. The various detents 27 and 37 may be formed of plastic or similar materials and integrally formed with, or screwed, bolted, glued or otherwise attached to side walls 17, 18.

Sifting device 14 may also be constructed of the same or similar materials as the housing. However, a metal screen material is preferred having a metal handle portion 35 attached thereto to enhance durability. Screen portions 28 and 33 are formed of a mesh material having openings of a size which will allow granular and small particulate matter such as sand or so-called "kitty litter" material to pass therethrough while retaining on their upper surfaces larger particles of refuse such as feces or clumped urine which are identified in FIGS. 3 and 4 by the reference numeral 41. Thus, during animal use, sifting device 14 is seated within base portion 12 and screen portions 28 and 33 are substantially covered with an abundance of absorbent litter material 40. Assembly 10 is then placed in a convenient home location for ready access by the family cat (or like-sized house pet) when the animal senses nature calling.

After animal use, assembly 10 is periodically cleaned in the manner to be now described. Sifting device 14 is pivotally moved up from the base portion 12 of assembly 10, as shown in FIGS. 3 and 4, by lifting handle 35 to thereby move main screen portion 33 up through litter material 40. Unclumped granular litter 40 passes through main screen 33 to thus remain in base portion 12 while clumped waste and feces 41 are collected on foraminous main screen 33 of device 14. As device 14 is pivoted still further upward, clumped waste and feces 41 fall from main screen 33 onto angled screen portion 28 as shown best in FIG. 4. The shown angled orientation of angled portion 28 is preferred because it provides a sloped surface for waste 41 to move further downward toward a waiting waste receptacle. Thus, when screen 33 ultimately reaches detents 37, angled screen portion 28 is sufficiently oriented to dump clumped waste and feces 41.

A preferred option includes the dumping of waste 41 into detachable waste receptacle 42 as shown in FIG. 4. Receptacle 42 is preferably a bag with handles 43 such as those currently available at a conventional supermarket. Receptacle 42 is then removed from housing 11 and with waste material 41 disposed therein, is immediately discarded in a conventional manner. Attachment and detachment of receptacle 42 to and from housing 11 is addressed in more detail below. Assembly 10 is then restored for animal use in the following fashion.

As shown in FIGS. 5–8, housing 11 is first rotated from its animal use position (its "first position") seated on bottom member 15 to a second seated position on end wall portion 20 as shown in FIG. 5. This rotation causes all litter material 40 which remained in base portion 12 after sifting device 14 was lifted therefrom to flow in response to gravitational forces into litter receiving wing portion 13 in an orderly and non-disruptive fashion. Once this initial flow of the litter material 40 has ceased, housing 11 is further rotated to a third seated position on end wall portion 21 as shown in FIG. 6. This second rotation causes any and all litter material 40 remaining in base portion 12 to be completely transferred into wing portion 13 and leave base portion 12 and bottom member 15 completely free of litter material 40. Roof portion 23 serves as a containment member (i.e., a detent) to operatively retain litter material 40 within wing portion 13 as shown in FIG. 6. The preferred embodiment of housing 11 is completely stable as a free-standing entity when placed on either of the wing portion end walls 20 or 21. Moreover, sifting device 14 is merely dangling in response only to gravity when assembly 10 is seated on wall 21.

Figure 7:
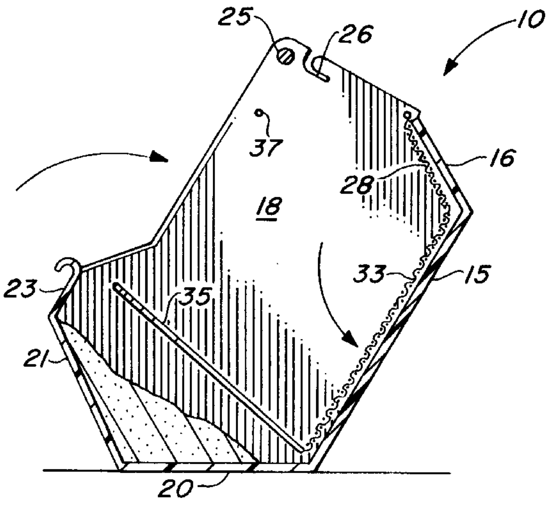
FIG. 7 is the cross-sectional view of the litter box and pivotal sifting device assembly shown in FIG. 3 returned to a seated position on the first end wall of the wing portion and showing the litter retained in an out-of-the-way position while the screen member is pivotally reseated in the base portion.

Next, housing 11 is rotated back onto end wall 20 (the so-called "second position") from its previous position on end wall 21 (the so-called "third position"). This rotation automatically causes sifting device 14 to pivot within the now empty base portion 12 back to its at rest position against bottom member 15 as shown in FIG. 7. Thus, sifting device 14 is, without interference from clean litter 40, automatically moved into its reinstalled position with main screen portion 33 in superposition to and preferably resting upon bottom member 15.

Figure 8:
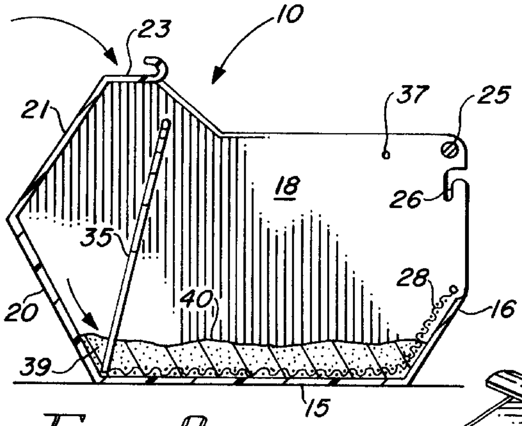
FIG. 8 is the cross-sectional view of the litter box and pivotal sifting device assembly as shown in FIG. 3 showing the litter material dispersed over the seated screen member in its ready-for-use position.

Assembly 10 is then rotated as shown in FIG. 8 back into its original animal use position, that is, from being seated on wall 20 to being seated on bottom member 15 of base portion 12. The angle of repose of litter material 40 is exceeded and litter material 40 flows back into base portion 12 where it overlays and covers main screen 33 of sifting device 14. At this point, assembly 10 is preferably shaken gently and/or temporarily rotated forward onto or nearly onto angularly disposed front wall 16 to obtain a uniform distribution of litter material 40 in base portion 12 and cover main screen 33 and part of angled screen 28 as shown in FIG. 8. Then, assembly 10 is again placed in an operative location seated on base member 15 for further animal use.

Housing 11 may, as described above, include a lip 24 and/or a handle 25. Either or both of these are intended to ease the human maneuvering of housing 11, particularly during the successive rotations of assembly 10 just described. For example, the first rotation may be simply performed by grasping handle 25 and lifting upward. The offset of handle 25 from the assembly center of gravity permits a natural rotation of assembly 10 toward the second seated position on wall 20. From this position, a lateral force on handle 25 will cause assembly 10 to rotate toward the third seated position on wall 21. Also grasping and using lip 24 during these rotations will enhance the stability of assembly 10 while it is being moved and rotated.

Handle 25 and lip 24 are also useful in rotating assembly 10 back through the successive rotations necessary to put assembly 10 back in the animal use position. First, when assembly 10 is seated on wall 21, a generally lateral force (in the direction opposite to that used above) is applied to handle 25. Preferably, a simultaneous upward force is also applied to lip 24. This urges assembly 10 back to the second position seated on wall 20. During this rotation, sifting device 14 responds to the force of gravity and automatically reseats itself in base portion 12. Then, a generally downward force on handle 25 is applied, preferably with a generally upward and/or lateral force on lip 24. This places assembly 10 in its seated position on bottom member 15. Assembly 10 is then temporarily rotated toward or onto front wall 16 to impose the desired, generally uniform distribution of litter material 40 in base portion 12. Throughout this process, no direct human or other non-gravitational force is applied to sifting device 14. Rather, device 14, in response only to gravity, automatically pivots and replaces itself in base portion 12 adjacent bottom member 15 underneath litter material 40.

Notches 26 and coactive exterior detents 27 are optional; as is the waste receiving bag/receptacle 42. If these are not used, other means or methods for collecting/receiving waste 41 from sifting device 14 can be employed. For example, an old newspaper or similar device (not shown) could be spread out in front of front wall 16 and then waste 41 can be dumped thereon using the same pivoting/sifting procedures described above. The paper would then be folded over and disposed of. Another option includes positioning the entire assembly 10 as necessary relative to a typical garbage receptacle such as a garbage can (not shown) so that the ordinary pivoting movement of sifting device 14 dumps waste 41 directly into the garbage can. This could be accomplished by manually holding the entire assembly in the proper position over the garbage can.

Figure 9:
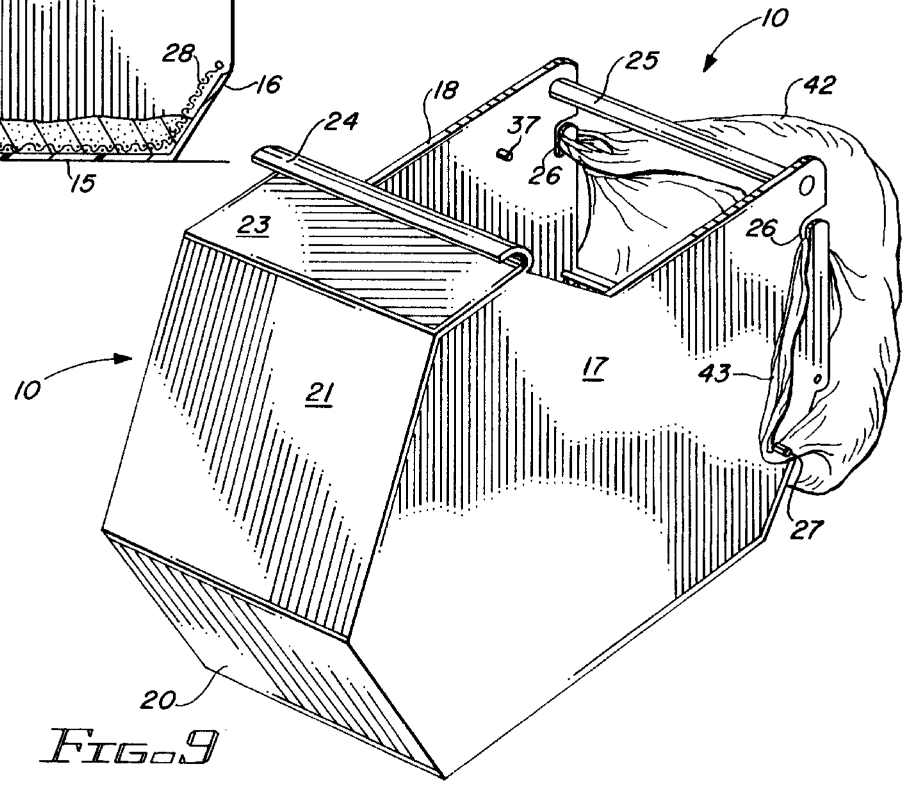
FIG. 9 is an isometric view of a litter box and pivotal sifting device assembly of the present invention having a waste receptacle attachment thereto.

However, as shown in FIG. 9, when notches 26 and detents 27 are used, a two loop handled bag/receptacle 42 may be detachably attached to assembly 10 by first maneuvering the upper side of each loop handle 43 into its corresponding notch 26. As shown, this is preferably performed so that the upper portion of each handle is disposed outside housing 11. Then, each loop is extended over its corresponding detent 27. Thus, as shown, the mouth of bag 42 is held open at the appropriate location adjacent front wall 16 to receive waste 41. Bag 42 is preferably sufficiently wide enough to stretch from side wall 17 to side wall 18 so that no spillage occurs out of the sides of bag 42. Bag 42 is simply removed for disposal by "unhooking" each handle 43 from its corresponding detent 27 and removing it from its corresponding notch 26. Bag 42 along with waste 41 contained therein is then discarded in the usual way.

In another practice of the present invention, a reusable bag-like receptacle having a pair of elastic loop handles adjacent to the mouth thereof (not shown) may be used to hold paper or other disposable non-handled bags in waste receiving position. Such a reusable receptacle can be made of canvas, denim or the like, and would receive one or more disposable liners, or paper or other non-handled bags in the proper position to receive waste 41. To install, each elastic loop handle would be stretched between and secured by the corresponding notch 26 and detent 27 arrangement on each side wall 17, 18, respectively, to cover the waste discharge opening 44. In this practice, the properly positioned disposable liner in the elastic handled receptacle receives the waste 41 and when the liner, paper bag, etc. is filled, it is then disposed of in the same manner as bag 42 described above. The principal advantage realized in this practice is that one need not rely solely on handled grocery bags as are currently in use. Rather, other bags/receptacles may be substituted therefor with the aid of the reusable elastic handled bag.

It should also be understood that the waste discharge opening, designated generally at 44 in FIG. 1, is bounded on its sides by the proximal edges of side walls 17, 18, by handle 25 on the top, and the upper edge of end wall 16 on its bottom. Opening 44 also serves as the main passageway for animal ingress to and egress from litter material 40. As such, it is preferable that opening 44 will be unobstructed except, of course, during the cleaning process when the bag 42 is in the way.

From the foregoing, it is readily apparent that a new and useful litter box and pivotal sifting device assembly has been herein described and illustrated which fulfills all of the aforestated objectives in a remarkably unexpected fashion. It is of course understood that such modifications, alterations and adaptations as may readily occur to the artisan confronted with this disclosure are intended within the spirit of this disclosure which is limited only by the scope of the claims appended hereto.

Accordingly, what is claimed is:

1. A litter box assembly comprising: a housing and a pivotally movable sifting device pivotally mounted to said housing; said sifting device having a handle, a foraminous, substantially rectangular main screen portion connected to said handle, an angularly disposed foraminous screen portion connected to said main screen portion, first and second post portions connected to said angularly disposed screen portion, said post portions being operably insertable into said housing to make said sifting device pivotal relative thereto; said housing including a base portion and a wing portion; said base portion having a rectangular bottom member which has a first side edge, a second side edge, a first end edge, and a second end edge, said base portion further having a first side wall, a second side wall, and an angled end wall, each of said side walls being attached to and extending perpendicularly upwardly one each from each of said side edges of said bottom member, and said angled end wall being connected to and extending angularly upwardly away from said first end edge of said bottom member; said wing portion having a first angularly disposed end wall having a first side edge, a second side edge, a top edge, and a bottom edge, said bottom edge of said first angularly disposed end wall being attached to said second end edge of said bottom member of said base portion to define therebetween an interior angle of about 120°, a second angularly disposed end wall having a first side edge, a second side edge, an upper edge and a lower edge, said lower edge of said second angularly disposed end wall being attached to said top edge of said first angularly disposed end wall to define therebetween an interior angle of about 120°, said wing portion further having a roof member which has a first side edge, a second side edge, a first end edge and a second end edge, said first end edge of said roof member being attached to said upper edge of said second angularly disposed end wall so that said roof member is disposed in substantially parallel relationship to said rectangular bottom member of said base portion, and said wing portion further being attached to said first and second side walls of said base portion, each of said side walls being attached to the adjacent side edges of said roof member, said first angularly disposed end wall, and said second angularly disposed end wall; and said pivotally movable sifting device being mounted so as to be seatable in said base portion between said side walls in generally superposed relationship above and adjacent to said bottom member in which position said main screen portion is adapted to receive granular absorbent litter material disposed thereupon.

2. A litter box assembly according to claim 1 in which said first and second side walls and said angled end wall coact to define a discharge opening adjacent to said angled end wall.

3. A litter box assembly according to claim 2 further comprising means for attaching a disposable refuse receptacle to said assembly, across said discharge opening, said means comprising at least one notch defined in and at least one detent attached to each of said side walls in spaced relationship to each other.

4. A litter box assembly according to claim 1 which further comprises at least one interior detent for halting the pivotal movement of said pivotal sifting device.

5. A litter box assembly according to claim 1 further comprising cylindrical handle means operatively interposed between said first and second side walls in spaced generally parallel relationship above said angled end wall.

6. A litter box assembly according to claim 1 further comprising lip handle means connected to said roof member.

7. A litter box assembly comprising: a substantially rectangular base portion having a seating surface; litter holding means attached to said base portion at one end thereof; and a pivotally movable sifting device pivotally mounted to said base portion; said sifting device having a handle, a foraminous, substantially rectangular main screen portion connected to said handle, an angled foraminous screen portion connected to said main screen portion, and pivoting means connected to said angled screen portion, said pivoting means being operably mounted in said base portion to make said sifting device pivotal relative thereto; said litter holding means having a plurality of end walls attached to and disposed at preselected angles relative to each other to provide at least one alternative seating surface for said litter box assembly; said litter box assembly further having a first side wall and a second side wall attached to said base portion and attached to each of said plurality of end walls such that said first side wall and said second side wall are in spaced generally parallel relationship to each other and coact with said plurality of end walls to define said litter holding means for temporarily receiving and holding litter therewithin; said litter being movable into said litter holding means from said open base portion when said litter box assembly is consecutively seated respectively on each of said plurality of end walls until said litter is transferred completely into said litter holding means and said bottom seating surface is completely free of litter for the repositioning of said sifting device into surface-to-surface engagement with said bottom seating surface.

8. A litter box assembly according to claim 7 further comprising sufficient particulate litter material to completely cover said sifting device when operatively disposed thereover but not more than can be contained in said litter holding means when all of said litter material is transported thereto by gravity action thereupon in response to the prescribed movement of said litter box assembly.

9. A litter box assembly according to claim 7 in which said first and second side walls coact to define a discharge opening adjacent to said base portion on the opposite end thereof from said litter holding means.

10. A litter box assembly according to claim 9 further comprising means for attaching a disposable refuse receptacle to said assembly in operative relationship to said discharge opening; said means comprising at least one notch defined in each of said side walls, and at least one detent attached thereto.

11. A litter box assembly according to claim 10 which further comprises at least one interior detent for halting the pivotal movement of said pivotal sifting device.

12. A litter box assembly according to claim 11 further comprising cylindrical handle means operatively interposed between said first and second side walls in spaced generally parallel relationship above said base portion.

13. A litter box assembly according to claim 12 further comprising lip handle means connected to said litter holding means.

14. A litter box assembly comprising a base portion including a bottom member, a pivotal sifting device pivotally attached to said base portion, a litter receiving wing portion operably connected to said base portion and litter transporting means operatively associated with said litter receiving wing portion for readily transporting granular litter material thereinto from said base portion to facilitate the restoration of said pivotal sifting device into said base portion, said litter transporting means comprising means for supporting said assembly through successive rotations of said litter box assembly containing granular litter material; whereby said successive rotations move said base portion through greater than ninety degrees about said litter receiving wing portion to completely transfer said granular litter material into said litter receiving wing portion and leave the bottom member of said base portion completely free of granular litter material whereupon said pivotal sifting device can be pivotally restored in said base portion without obstruction.

15. A litter box assembly according to claim 14 in which said means for supporting said assembly through said successive rotations comprises a first angularly disposed end wall attached to and disposed relative to the base portion of said litter box assembly to define an interior angle of greater than ninety degrees; a roof member; and a first side wall and a second side wall each of which is operatively interposed between and attached to both said roof member and said first angularly disposed end wall; said first angularly disposed end wall providing a base upon which said litter box assembly may rest after rotation thereof; said means for supporting said assembly through successive rotations further comprising a second angularly disposed end wall connected between said roof member and said first angularly disposed end wall to define an included angle less than one hundred eighty degrees between said first angularly disposed end wall and said second angularly disposed end wall; said second angularly disposed end wall providing a second base upon which said litter box assembly may rest after further rotation of said litter box assembly.

16. A litter box assembly according to claim 14 which further comprises means for attaching a disposable refuse receptacle to said assembly.

17. A litter box assembly according to claim 14 which further comprises at least one interior detent for halting the pivotal movement of said pivotal sifting device.

18. A litter box assembly according to claim 14 which further comprises a front cylindrical handle connected to and between said first and second side walls.

19. A litter box assembly according to claim 14 which further comprises a lip handle connected to said roof member.

* * * * *